(12) United States Patent
Minor

(10) Patent No.: US 7,452,018 B2
(45) Date of Patent: Nov. 18, 2008

(54) EXHAUST STACK SIMULATOR

(75) Inventor: Danny R. Minor, Decatur, AL (US)

(73) Assignee: Vision Global Trading, Inc., Decatur, AL (US)

( * ) Notice: Subject to any disclaimer, the term of this patent is extended or adjusted under 35 U.S.C. 154(b) by 221 days.

(21) Appl. No.: 11/580,754

(22) Filed: Oct. 13, 2006

(65) Prior Publication Data

US 2007/0048465 A1  Mar. 1, 2007

(51) Int. Cl.
*B62D 39/00* (2006.01)
(52) U.S. Cl. ........................................ 296/1.08; 428/31
(58) Field of Classification Search ................ 296/1.08; 428/31; 454/356; D23/373, 374
See application file for complete search history.

(56) References Cited

U.S. PATENT DOCUMENTS 4,546,021 A    10/1985   Mears
5,067,061 A *  11/1991   Prickett ...................... 362/145
6,077,576 A     6/2000   Osborn

OTHER PUBLICATIONS

Photograph of a World War II era airplane.

* cited by examiner

*Primary Examiner*—Lori L Lyjak
(74) *Attorney, Agent, or Firm*—Angela Holt; Lanier Ford Shaver & Payne P.C.

(57) ABSTRACT

A decorative trim for an automotive vehicle which simulates the exhaust stack of an automotive motor is claimed. The exhaust stack simulator comprises a base plate from which multiple tubes protrude which simulate pipes exhausting from the engine of an automobile. A gasket is installed between the base plate and the vehicle surface to protect the surface and to adjust for irregularities in the surface of the vehicle. A backing plate on the interior surface of the vehicle distributes the weight of the base plate across the surface of the vehicle. Studs affixed to support brackets on the base plate pass through openings in the gasket, the vehicle and the backing plate, and the components are joined together with standard fasteners.

16 Claims, 3 Drawing Sheets

EXHAUST STACK SIMULATOR

FIELD OF THE INVENTION

The present invention relates generally to the field of vehicle trim, and more specifically, to vehicle trim simulating a multiple-tube exhaust stack on the exterior portions of automotive vehicles.

BACKGROUND/SUMMARY OF THE INVENTION

Decorative trim is widely used to enhance the appearance of automotive vehicles. Trim such as pinstripes and molding is often applied to the exterior surface of vehicles for aesthetic purposes. Drivers interested in making their vehicles appear more "powerful" may also choose to apply trim that simulates the appearance of additional engine capacity and performance.

The present invention is intended to simulate the appearance of a horizontal exhaust stack consisting of multiple tubes exhausting from the engine of a vehicle. In one embodiment of the invention, the exhaust stack simulator is designed to be installed on the generally-vertical or sloped hood portions of conventional cab tractor trailers.

The exhaust stack simulator according to the present invention provides a outer plate in the form of an elongated strip of metallic material in the shape of a plurality of exhaust tubes and having a plurality of securing means for securing the strip to the vehicle body. In one embodiment of the invention, the outer plate is generally hollow and support brackets on the rear side of the outer plate provide additional structural support and act as a base for threaded studs. The threaded studs are the fasteners for connecting the exhaust stack simulator to the vehicle, and they pass through holes drilled in the vehicle body. An elongated gasket is sized slightly larger than the outer plate and is installed between the outer plate and the vehicle body. The gasket serves the purposes of providing a cushion for the outer plate against the vehicle body and also provides flexibility to ensure a tight fit between the outer plate and the vehicle body, adjusting for any irregularities in the vehicle body.

An elongated backing plate is secured to the inside of the vehicle body with nuts that mate with the studs. The backing plate serves the purposes of distributing the weight of the outer plate across the surface of the vehicle body, so that the weight of the outer plate is not pin-pointed at the fastener locations, as would be the case if traditional washers were used. The backing plate contains a plurality of holes through which threaded studs pass.

The exhaust stack simulator is designed to withstand the vibrations and environmental conditions associated with the operation of large road vehicles.

For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein.

These and other embodiments of the present invention will also become readily apparent to those skilled in the art from the following detailed description of the embodiments having reference to the attached figures, the invention not being limited to any particular embodiment(s) disclosed.

Figure 1:
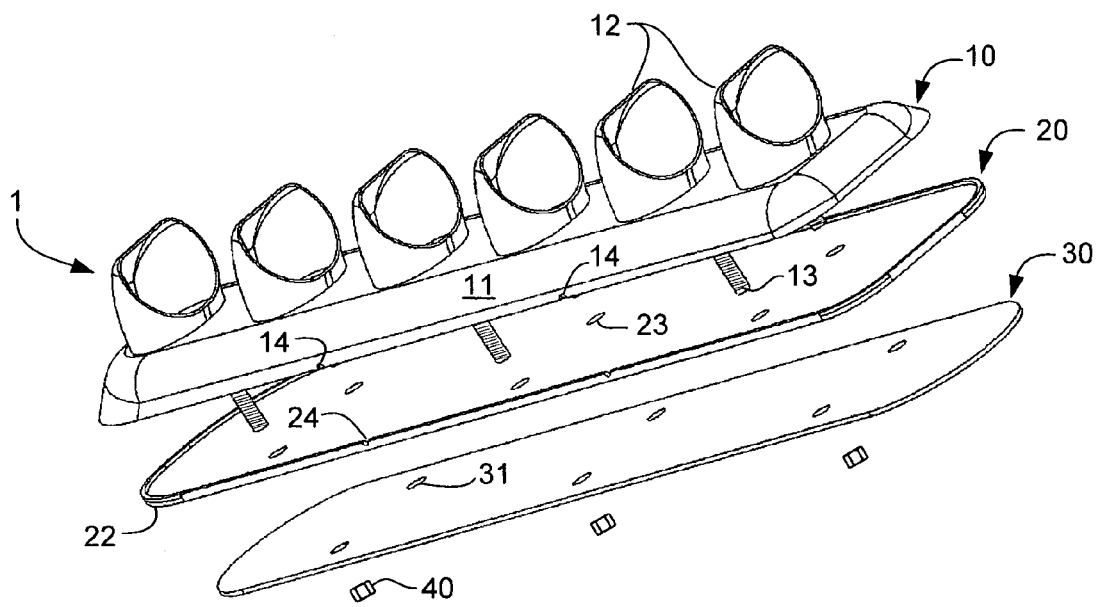
FIG. 1 is an exploded rearward perspective view of one embodiment of the exhaust stack simulator.

Repeat use of reference characters throughout the present specification and appended drawings is intended to represent the same or analogous features or elements of the invention.

DETAILED DESCRIPTION

The present invention and its advantages are best understood by referring to the drawings. The elements of the drawings are not necessarily to scale, emphasis instead being placed upon clearly illustrating the principles of the invention.

FIG. 1 is an exploded view of an exhaust stack simulator 1 according to one embodiment of the invention. The simulator 1 consists generally of outer plate 10, gasket 20, and backing plate 30 which may be joined together via a plurality of fasteners. In the illustrated embodiment, the fasteners comprise nuts 40 and threaded studs 13.

Figure 2:
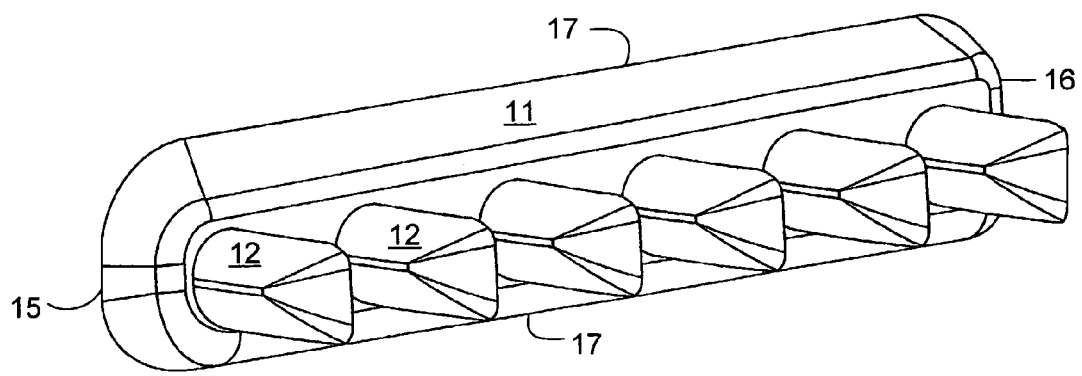
FIG. 2 is a front perspective view of the outer plate of one embodiment of the exhaust stack simulator.

Outer plate 10 is a generally oblong plate with forward edge 15, rearward edge 16, and two side edges 17, as illustrated in FIG. 2. Outer plate 10 further comprises base plate 11 and a plurality of tubes 12 protruding therefrom. In one embodiment of the invention, tubes 12 are aligned in a single row parallel to the longitudinal axis of outer plate 10.

As used in this application, directions are referenced with respect to the vehicle on which the exhaust stack simulator is to be installed. For example, the term "inner" refers to the portion of the simulator that is to be against the vehicle body. "Outer" refers to the portions of the simulator that are distal to the vehicle body when it is installed. "Forward" refers to the portion of the simulator that is oriented toward the front of the vehicle when it is installed. "Rearward" refers to the portion of the simulator that is oriented toward the rear of the vehicle when it is installed. "Bottom" refers to the portion of the simulator that is oriented toward the bottom portion of the vehicle when it is installed. "Top" refers to the portion of the simulator that is oriented toward the top portion of the vehicle when it is installed.

Figure 3:
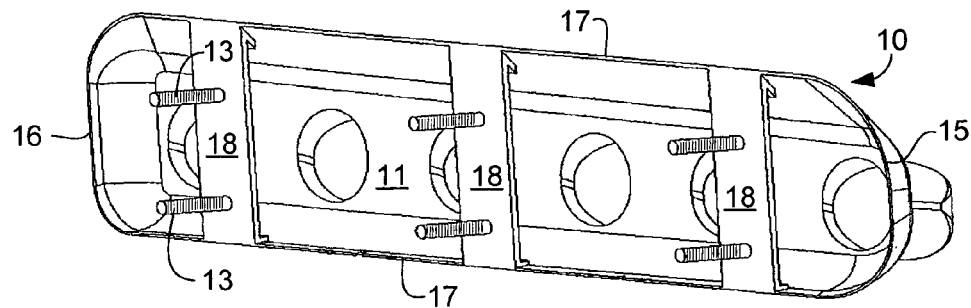
FIG. 3 is a rear perspective view of a outer plate of one embodiment of the exhaust stack simulator.

FIG. 3 illustrates the inner side of one embodiment of outer plate 10. As can be seen in this figure, outer plate 10 comprises base plate 11, which is a generally hollow protruding base, joined to a plurality of support brackets 18 that span the side edges 17 of the inner side of outer plate 10. Utilizing a hollow base with support brackets in this manner reduces the weight of the outer plate 10. Three (3) support brackets 18 are present in the illustrated embodiment, but more or fewer brackets may be desired for embodiments of different sizes and weights.

In one embodiment of the invention, fasteners comprise threaded studs 13 rigidly affixed to the support brackets 18 of the outer plate 10. Nuts 40 are generally standard locking nuts of sufficient size to mate with studs 13. The embodiment of the invention illustrated in FIGS. 1, 3 and 4 utilizes six studs and six nuts, though other numbers of stud/nut combinations would be appropriate, depending upon the size and weight of the exhaust stack simulator. Further, other types of fasteners may be employed instead of threaded studs that are rigidly affixed to support brackets. For example, there may be openings on the support brackets to receive standard bolts that mate with standard nuts.

Figure 4:
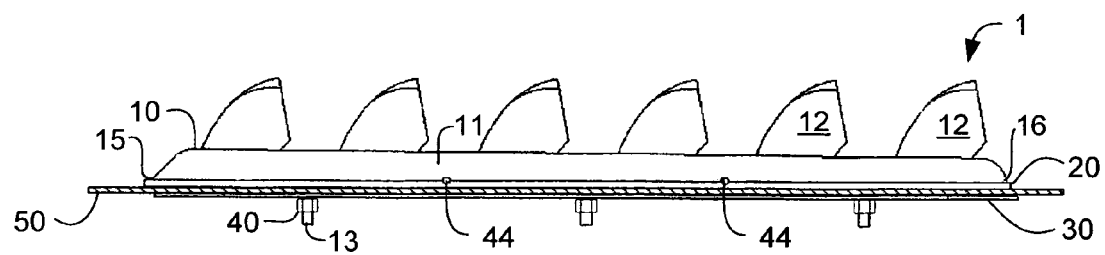
FIG. 4 is a bottom view of one embodiment of the exhaust stack simulator, in an as-installed configuration.

FIG. 4 illustrates a bottom view of one embodiment of the exhaust stack simulator 1. As shown in this figure, the plurality of tubes 12 that protrude from the base plate 11 of outer plate 10 are angled or curved toward the rearward edge 16 of outer plate 10. This angling or curving of the tubes 12 toward the rear of the plate 10 enhances the aerodynamic look and performance of the exhaust stack simulator. Further, in this embodiment, tubes 12 are aligned in a single row along the longitudinal axis of the simulator 1. Although the illustrated embodiment shows an exhaust stack simulator with six (6) tubes 12, more or fewer of tubes could be included without departing from the scope of the present invention. In addition, the tubes could be presented in multiple rows, instead of a single row along the longitudinal axis of the simulator.

In some embodiments of the invention, the base plate 11 is thicker at its forward edge 15 than at its rearward edge 16, and the thickness reduces from the forward edge to the rearward edge (i.e., the outer surface of base plate 11 may be angled from the forward edge to the rearward edge of the plate). In one embodiment of the invention, the thickness of the forward edge 15 of the base plate 11 is about ¼ inches greater than the thickness at the rearward edge 16. The purpose for this varying thickness is because the hoods of many vehicles are narrower at the front and widen toward the back. The angling of the base plate is intended to compensate for this narrowing of the vehicle's hood while providing simulated support for tubes that, if operational, may be protruding from the engine of the vehicle at a uniform length.

In one embodiment, the thickness of the outer plate 10, including the base plate 11 and tubes 12, is approximately 3.9 inches. Further, in one embodiment, the outer plate 10 is about 30.8 inches in length and about 6.2 inches high. Other thicknesses and dimensions are possible without departing from the scope of the present invention Outer plate 10 may be manufactured from any number of rigid materials, such as stainless steel, aluminum, chrome, composite, polymeric, or ceramic materials. In one embodiment, outer plate 10 is fabricated from about ⅛" thick stainless steel, though other thicknesses may be used.

Gasket 20 is a generally-thin, oblong gasket slightly larger in surface area than outer plate 10. In some embodiments of the invention, gasket 20 has a protruding peripheral flange 22 extending roughly perpendicularly from the gasket, within which the outer plate 10 fits for attaching to the vehicle. Gasket 20 also includes a plurality of openings 23 through which the studs 13 of the outer plate pass. Gasket 20 may be fabricated from any number of weather resistant flexible or semi-flexible materials, such as silicone, rubber, or suitable polymerics. In one embodiment the gasket has a thickness of about ¼ inches, though other thicknesses would also be appropriate.

As illustrated in FIG. 1, base plate 11 may include on its bottom edge a plurality of grooves 14 which are cut into the bottom edge of base plate 11. Also shown in FIG. 1 is a plurality of grooves 24 cut into the flange 22 of gasket 20, in locations corresponding to the grooves 14 in base plate 11. In one embodiment, the grooves 14 and 24 are ⅛"×¼" rectangles, though other dimensions and shapes may be used. When the outer plate 10 is mounted on the gasket 20, the grooves 14 in the base plate 11 line up with the grooves 24 in gasket 20 to form weep holes 44, as illustrated in FIG. 4. The purpose of the weep holes 44 is to allow moisture that may accumulate in the exhaust stack simulator to drain.

As shown in FIGS. 1 and 4, backing plate 30 is a thin, generally-oblong flat plate comprising through holes through which the studs 13 on the outer plate 10 or other suitable fasteners may pass. The purpose of the backing plate 30 is to perform the function of conventional washers to relieve friction and distribute pressure, but the backing plate improves upon conventional washers by allowing a wider distribution the weight of the device against the vehicle surface. This weight distribution may be important, because many vehicle exteriors are fabricated from lightweight fiberglass materials. The backing plate may also be used as a template for drilling holes in the vehicle to mount the exhaust stack simulator. Depending up on the size and weight of the outer plate 10, backing plate 30 may be replaced with conventional washers in some embodiments of the invention. Backing plate 30 may be fabricated from any number of rigid materials, including galvanized steel or aluminum.

Figure 5:
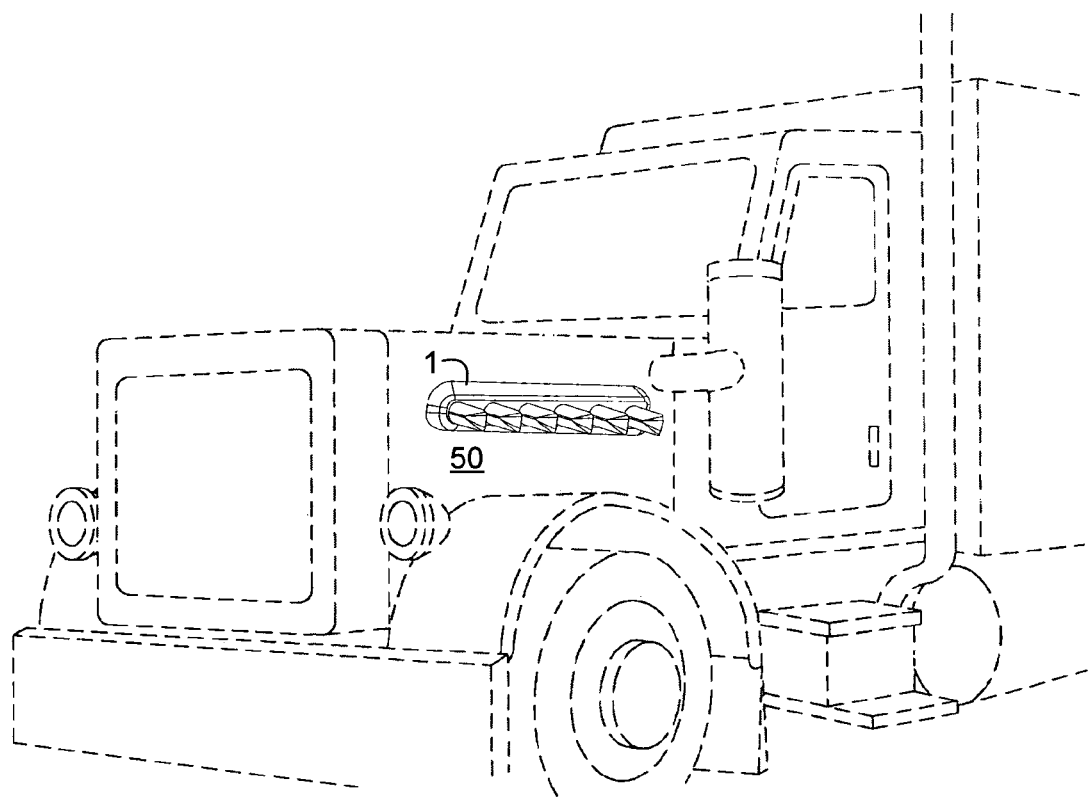
FIG. 5 illustrates one embodiment of the exhaust stack simulator installed on a conventional cab vehicle.

The exhaust stack simulator 1 is designed to be installed on the exterior of automotive vehicles, and in particular on the generally-vertical or sloped portions of the hoods of conventional cab trucks. FIG. 5 illustrates an exhaust stack simulator installed on a truck in such a manner. To install the exhaust stack simulator, holes for the studs must first be formed or drilled through the vehicle surface 50. Backing plate 30 may be used as a template for the placement of the holes. Outer plate 10 is then installed onto the vehicle surface on top of gasket 20. Backing plate 30 is installed on the interior of the vehicle surface, and nuts 40 are used to secure the components together and to the vehicle. FIG. 4 shows a bottom view of the exhaust stack simulator as installed on a vehicle.

This invention may be provided in other specific forms and embodiments without departing from the essential characteristics as described herein. The embodiment described is to be considered in all aspects as illustrative only and not restrictive in any manner.

As described above and shown in the associated drawings and exhibits, the present invention comprises an exhaust stack simulator. While particular embodiments of the invention have been described, it will be understood, however, that the invention is not limited thereto, since modifications may be made by those skilled in the art, particularly in light of the foregoing teachings. It is, therefore, contemplated by the appended claims to cover any such modifications that incorporate those features or those improvements that embody the spirit and scope of the present invention.

What is claimed is:

1. An exhaust stack simulator for use as a decorative trim on a vehicle comprising
    a base plate;
    a plurality of tubes protruding from the base plate, whereby the plurality of tubes simulates the appearance of a plurality of external exhaust pipes protruding from an automotive vehicle engine; and
    fasteners for attaching the base plate to the vehicle.

2. The exhaust stack simulator of claim 1, wherein the base plate is elongated horizontally and comprises top and bottom long sides and forward and rearward short ends.

3. The exhaust stack simulator of claim 2, whereby the plurality of tubes protrudes from the base plate at an angle toward one short end of the base plate.

4. The exhaust stack simulator of claim 2, whereby the plurality of tubes is aligned along the longitudinal axis of the base plate.

5. The exhaust stack simulator of claim 1, further comprising a gasket.

6. The exhaust stack simulator of claim 5, wherein the gasket comprises a flat body and a flange sized to accept the outside edge of the base plate.

7. The exhaust stack simulator of claim 1, wherein the base plate is rigid.

8. The exhaust stack simulator of claim 1, wherein the base plate is hollow.

9. The exhaust stack simulator of claim 2, further comprising a plurality of support brackets rigidly affixed to the inner side of the base plate, whereby the support brackets span and are affixed to the top and bottom sides of the base plate.

10. The exhaust stack simulator of claim 9, wherein the fasteners comprise a plurality of threaded studs rigidly affixed to the support brackets.

11. The exhaust stack simulator of claim 5, wherein the gasket comprises holes for accepting the fasteners.

12. The exhaust stack simulator of claim 1, further comprising a backing plate.

13. The exhaust stack simulator of claim 12, wherein the backing plate comprises holes for accepting the fasteners.

14. An exhaust stack simulator for use as a decorative trim on a vehicle comprising
   an elongated base plate with a longitudinal axis, a forward edge, a rearward edge, and top and bottom edges generally parallel to the longitudinal axis;
   a plurality of tubes protruding from the base plate, whereby the plurality of tubes simulates the appearance of a plurality of external exhaust pipes protruding from an automotive vehicle engine; and
   fasteners for attaching the base plate to the vehicle.

15. A horizontal exhaust stack simulator comprising
   an elongated base plate with two long sides and two short sides;
   a plurality of tubes protruding from the base plate aligned along the longitudinal axis of the base plate, whereby the plurality of tubes simulates the appearance of external exhaust tubes of an automotive vehicle and whereby the plurality of tubes are angled toward one of the short sides of the base plate;
   support brackets rigidly affixed to the inner side of the elongated base plate;
   a gasket with a flange for accepting the base plate;
   a backing plate; and
   fasteners for attaching the base plate, gasket, and backing plate to the vehicle.

16. The horizontal exhaust stack simulator of claim 15, wherein the fasteners comprise threaded studs rigidly affixed to the support brackets and nuts for mating with the threaded studs.

* * * * *